Figure 3:
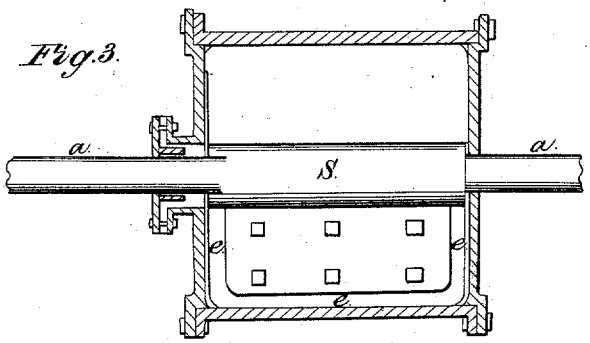
Figure 1:
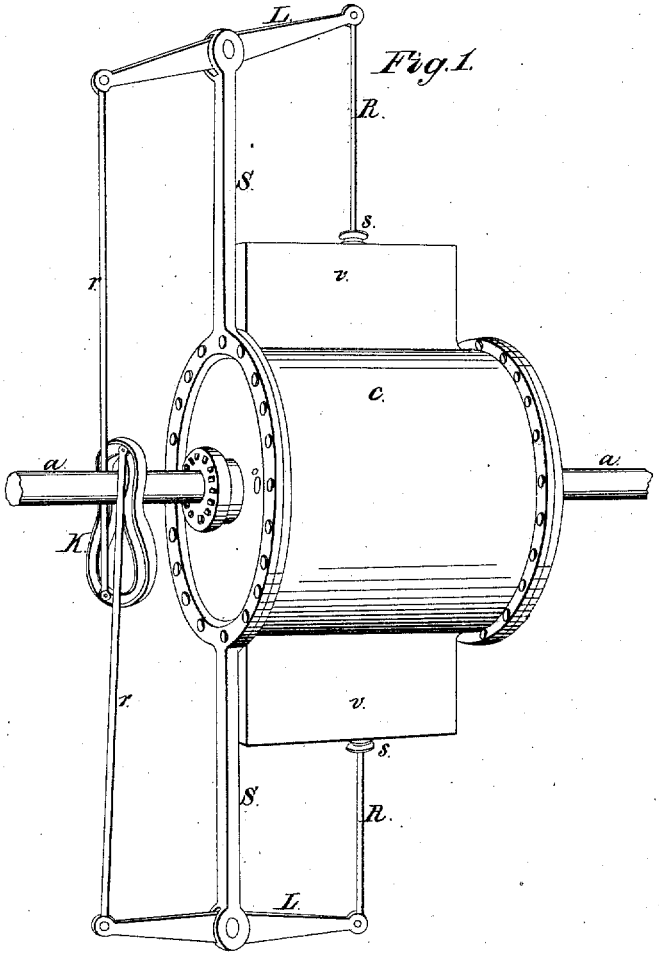
Figure 2:
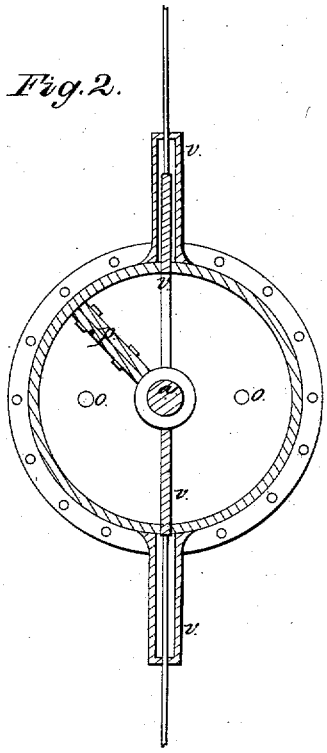

2591X

E. Burt,

Rotary Steam Engine.

Patented May 12, 1816.

N. PETERS, PHOTO-LITHOGRAPHER, WASHINGTON, D. C.

2591X

Pat. May 12, 1816

Enoch Burt

Letters Patent.

The Schedule referred to in these Letters Patent and
making part of the same containing a description in the
words of the said Enoch Burt himself of his improvement in
the Steam Engine First in a piston revolving in a circular cylinder
or steam vessel, instead of reciprocating in a rectilineal one by
which means the power is applied immediately to the main axis
Second The power acts constantly at right angles which can
not be the case in the common engine —

Third the steam act without intermission on the
piston constantly propelling it forward whereas in the common
engine the piston is brought to rest twice in every revolution
of the main axis My engine is constructed after the following manner
The cylinder or steam vessel may externally resemble a solid
ring, or the common cylinder lying horizontally — The axis pa[illegible]
through its centre, the piston is attached to the axis. —
As the axis revolves the piston describes a circle correspond[illegible]
to the internal cavity of cylinder to prevent the steam fr[illegible]
passing by the piston it is packed after the common mann[illegible]
at opposite sides of the cylinder are two sliding valves fo[illegible]
the steam alternately to react upon — If one of these valves b[illegible]
shut, and the piston standing in front of it the steam be adm[illegible]
between them it will of necessity act on the piston, and pr[illegible]
it forward; the opposite valve being open the piston will pass
its place in the cylinder without obstruction, but immediately
on the piston passing that point the valve begins to close and
will be completely shut when the piston has come to [illegible]

2591 from a right angle with it, at the instant the steam is shifted into the other part of the cylinder between the piston and the valve that had just closed, while the steam behind this valve is condensed, and the other sliding valve is opened so that the piston now passes by its place in the cylinder as it had that of the other when this valve also closes the steam is shifted as before between the valve and piston and the opposite side at the same time is condensed Since then the sliding valve in the cylinder which opens at the approach of the piston and closes after it shuts down in the middle of the steam it is evident that at the moment the steam shifts or is in the act of shifting that section of the cylinder which lies between the valve last shut and the piston is fully charged with steam into which the steam is again admitted as it shifts which is an operation almost instantaneous hence the piston must have the full and constant action of the steam upon it and a constant vacuum before it If the steam be shifted by the hand of the engineer so as to act on the opposite side of the piston, the motion is instantly reversed, which will continue until by a similar operation the first motion be again restored, It may be proper here to state that I make use of the common condensing apparatus, only adapting it to my engine, and also that I convey the steam into the cylinder through the common steam chest, & shift it by the sliding valve therein, With these exceptions, the above described engine I claim as an invention and improvement of my own Witness Fras B. Ogden }
David Meeker }

Enoch Burt

Exd [illegible]

[illegible]

(Patented May 12. 1816)